United States Patent [19]

Bayerlein et al.

[11] Patent Number: 4,812,842

[45] Date of Patent: Mar. 14, 1989

[54] DEVICE FOR THE CONTROL OF ROTARY PRINTING MACHINES

[75] Inventors: Friedrich K. Bayerlein, Veitshöchheim; Dietrich R. K. Leuerer, Würzburg; Karl H. Rindfleisch, Margetshöchheim, all of Fed. Rep. of Germany

[73] Assignee: Koenig and Bauer A. G., Wurzburg, Fed. Rep. of Germany

[21] Appl. No.: 43,514

[22] Filed: Apr. 28, 1987

[30] Foreign Application Priority Data

Apr. 30, 1986 [DE] Fed. Rep. of Germany ....... 3614744

[51] Int. Cl.[4] ......................... H04Q 7/00; H04B 9/00; B41F 5/04

[52] U.S. Cl. ............................. 340/825.720; 101/219; 101/DIG. 47; 101/426; 455/601

[58] Field of Search ...................... 340/825.69, 825.72; 455/601, 603, 617, 613; 101/92, 143, 219, 426, DIG. 13, DIG. 26, 226, 228

[56] References Cited

U.S. PATENT DOCUMENTS

| | | | |
|---|---|---|---|
| 4,665,824 | 5/1987 | Greiner et al. | 101/426 |
| 4,706,566 | 11/1987 | Kishine et al. | 101/219 |
| 4,717,913 | 1/1988 | Elger | 455/613 |
| 4,727,600 | 2/1988 | Avakian | 455/601 |

*Primary Examiner*—Donald J. Yusko

*Attorney, Agent, or Firm*—Jones, Tullar & Cooper

[57] ABSTRACT

A wireless control device for a large printing machine includes at least one portable hand unit having a transmitter, and a plurality of push buttons for selecting a desired command to be sent to one of a plurality of electronic control units associated with the printing machine. The commands are transmitted, by electromagnetic radiation, such as infrared waves, or by ultrasonic waves, to receiving and decoding units that are connected to each of the control units. To insure that the control units are not inadvertently actuated, signal verification circuiting can be provided. This circuitry enables a signal received by one of the receiving and decoding units to be retransmitted back to the hand unit, where it is compared with the original signal in the transmitter, to insure that the two coincide. A speech analysis system can be employed with the device to enable commands to be entered verbally.

9 Claims, 3 Drawing Sheets

DEVICE FOR THE CONTROL OF ROTARY PRINTING MACHINES

BACKGROUND OF THE INVENTION

The present invention relates to a wireless device for feeding control commands to the electronic machine controller of a rotary printing machine.

Wireless devices for remotely controlling apparatus, such as televisions, have long been known in the art. These devices utilize electromagnetic energy or ultrasound to transmit control signals from the wireless device to a receiver contained in the apparatus to be controlled. The wireless device essentially consists of a transmitter installed in a handy portable housing, and a plurality of command push buttons. The control commands are transmitted by means of modulated electromagnetic waves or ultrasound waves to the receiver. There they are converted by means of decoding units into on/off signals.

In web-fed rotary printing machines, which can be 50 meters and more long, there are a large number of command push buttons provided on the different machine parts, with which the various commands for the operation of the machine or individual parts of the machine can be given. Until now, all of these push buttons had to be wired up, which meant a considerable expenditure in space in the machine, and in costs for the electric devices and wiring. Furthermore, for design reasons, the command devices could frequently not be placed where they were ergonomically favorable, so that comfortable operation was sometimes not possible.

SUMMARY OF THE INVENTION

It is therefore an object of the present invention to provide a device for the wireless control of web-fed rotary printing machines with which it is possible, even in very long machines, to give out control commands wirelessly and with reliability from any position of the machine.

It is a further object of the invention to provide a control device for a web-fed rotary printing machine which employs handy, portable transmitter units that can be easily temporarily attached to machine parts so that the machine is easily operable from places from which operation was previously only possible with discomfort.

It is yet another object of the present invention to provide a control device which considerably reduces the expenditure for the wiring of the command push buttons on long web-fed rotary printing machines.

These, and other objects of the invention are achieved through the use of a portable hand held transmitter unit, which is designed to send control signal sequences to a plurality of receivers and decoders that are connected to various electronic control units for the mechanisms of a web-fed printing machine. The hand held transmitter unit includes a plurality of color coded push buttons for the entry of commands, and generating means are provided which respond to the push buttons inputs, and generate control signal sequences. These are sent out from the transmitter by a suitable modulation technique, such as by pulse code modulation, to the various receiving and decoding units, which convert the control signal sequences into ASCII character strings, for example, and transfer them via light conductors, or the like, to the control units. The transmission medium employed can either be electromagnetic radiation, such as induction loops, infrared frequency waves, or radio frequency waves; or acoustic radiation, such as ultrasonic waves. To reduce interference, narrow band filters can be disposed in the transmitter and receiver, and polarized waves can be utilized if desired.

A portable energy source, such as a battery, is disposed in the housing to power the device. Inductive charging means can also be provided for the energy source for recharging the same from a remote source of power.

For increased convenience, small magnets can be disposed on the bottom side of the housing so that the hand unit can be temporarily attached to the metal machine parts of a printing machine.

A plurality of the portable hand units can be employed, and if desired, a separate transmitter unit and corresponding receiver and decoding unit can be allocated to each electronic control unit of the printing machine.

A character display is disposed in the portable housing to provide a visual indication of the command that has been selected (a similar display can be provided on the printing machine for indicating each command that is received.) This display can also be employed, when a receiver is provided in the housing, to indicate any fault or failure messages that are received. In addition, an acoustical generating means can be disposed in the portable hand unit to provide audible indications of any received messages.

To eliminate or substantially reduce the likelihood that the control units will be actuated accidentally or unintentionally, a signal verification system can be incorporated into the device. Specifically, an additional receiver unit is disposed in the portable hand unit, and each receiver unit associated with the various control units, is replaced with a transceiver unit. When a control signal sequence is transmitted to the transceiver, the transceiver retransmits the sequence back to the receiver in the hand unit. A comparator circuit is disposed in the hand unit which then compares the transmitted sequence with the received sequence. If the two sequences coincide completely with one another, a confirmation signal sequence is sent to the transceiver, decoded, and fed to the control unit. If desired, the comparator function can be carried out by a microcomputer. Also, to further insure the proper operation of the device, the control signal sequence can be transmitted, retransmitted, and compared twice before the confirmation signal will be generated.

The two way communication link between the hand unit and each of the transceivers can also be employed for the transmission of fault/failure messages, safety functions, or operating data to the display. It can further be used to set off acoustic warning signals, or for coupling control master computers and slave control computers.

Conventional error checking means can also be employed to improve the reliability of the device. For example, each control signal sequence can include some type of error detection scheme, such as check sums, to insure that the sequences are correctly transmitted. Also, since each of the control signal sequences consists of a plurality of signals followed by pauses, the pauses can be utilized as well for verification or comparison purposes. Means can also be incorporated into the receiver or transceiver to detect and ignore any received control signal sequences that are illogical.

In a further modification of the invention, a speech analysis system is employed to enable inputs to the transmitters to be made verbally. The system can be made to respond to the tone color of the individual operators' voices, if desired, for determining the admissibility of certain commands. The speech analysis system can be connected to the transmitters with either a conventional electrical line, or a wireless link that employs infrared modulation, for example. In a similar manner, any system outputs could be converted from wireless signals (e.g. infrared modulated signals) into a verbal output if desired.

For use of the present invention with a very large printing machine, one or more relay stations can be employed to insure that all commands are properly transmitted and received, even from remote parts of the machine. Each of these relay stations includes a transmitter and a receiver, with the transmitter being aligned with the transceiver of the control unit to which a command is to be sent, and the receiver being aimed in the general direction from which the control signal sequences from the hand units will be transmitted.

BRIEF DESCRIPTION OF THE DRAWINGS

The foregoing and additional objects, features and advantages of the present invention will become apparent to those of skill in the art from the following more detailed consideration thereof taken in conjunction with the accompanying drawings, in which.

DETAILED DESCRIPTION OF THE PREFERRED EMBODIMENTS

Figure 1:
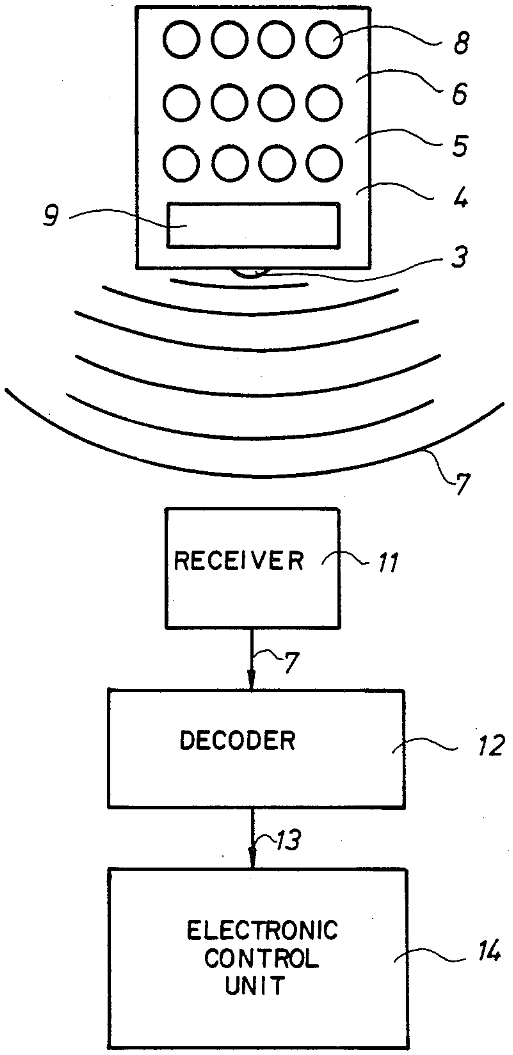
FIG. 1 is a diagrammatic illustration of the principle structure of a wireless control device for a rotary printing machine.

Turning now to FIG. 1, there is illustrated a portable hand unit 5 having a transmitter 3 in a housing 4. On an operating surface 6 of the housing 4 are a plurality of command push buttons 8, and a display 9 for displaying the command just given in alpha-numeric characters. Disposed on the bottom of housing 4 are one or more magnets (not shown) which enable the housing to be temporarily attached to a metal surface if desired.

By depressing a command push button 8, a pre-specified signal in the form of a control pulse signal sequence is created in the transmitter 3. This pulsed signal, which can consist of electromagnetic waves, light rays, infrared rays or ultrasound waves, is transferred wirelessly to a receiver 11. From the receiver 11, the received signals are amplified, and fed by a signal path 7, to a decoder 12, which converts each signal into a corresponding control command (e.g. an ASCII character string), and subsequently feeds the same via a signal path 13 (e.g. a light conductor) to an electronic control unit 14. The electronic control unit activates the final control elements such as motors, valves, etc., that form a part of the web-fed rotary printing machine, this control unit can be, for example, a free programmable control for the printing machine drive.

Figure 2:
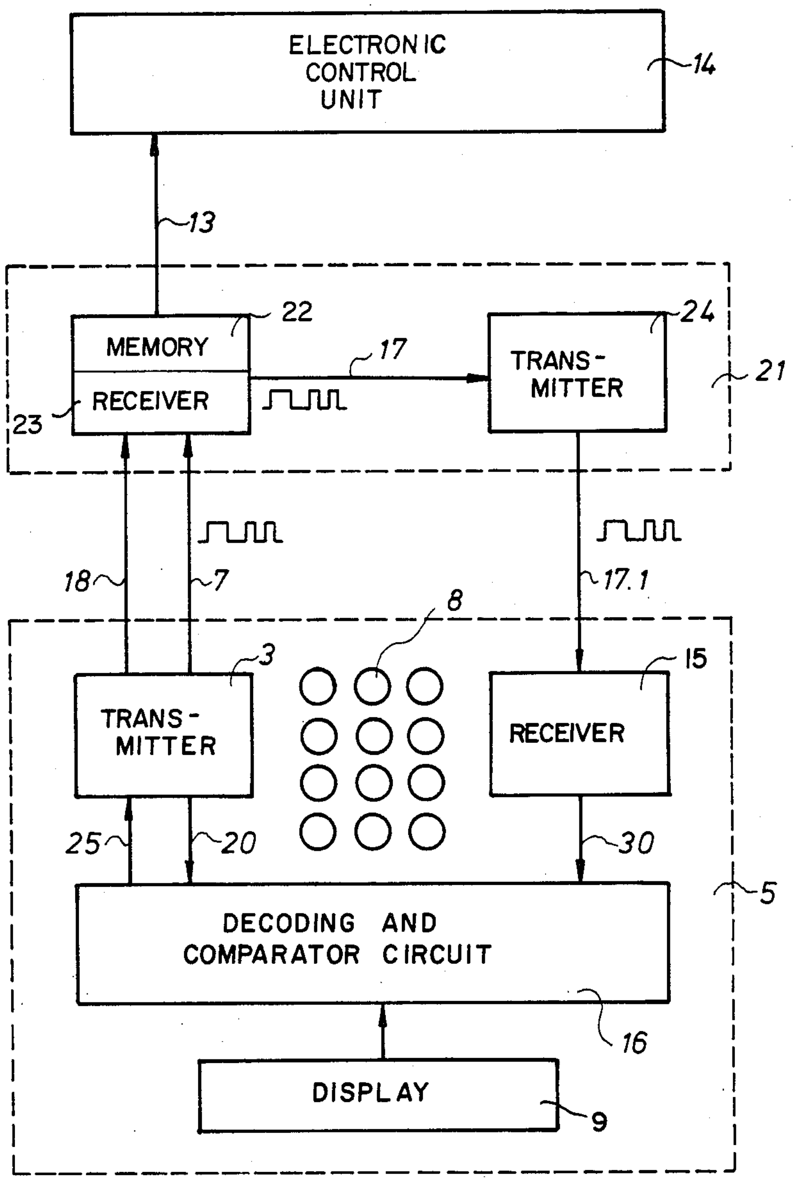
FIG. 2 is a diagrammatic illustration of a wireless control device having signal verification or checking circuitry; and, FIG. 3 is a diagrammatic illustration of a wireless control system for a web-fed rotary printing machine utilizing relay stations suspended in the printing shop.

During the application of a wireless commanding of machines, the unintended initiation of commands must be absolutely excluded. For this reason, the wireless device for commanding is designed as shown in FIG. 2. Specifically, hand unit 5 is shown in FIG. 2 as including transmitter 3, command push buttons 8, display 9, a receiver 15, and a decoding and comparator circuit 16. Hand unit 5 also includes a voltage supply, e.g. rechargeable battery, that is not shown. This battery may be recharged from a remote power source by induction loops, if desired.

The decoding and comparator circuit 16 fulfills the task, in a short time span, e.g. 10 msec., of determining the complete coincidence of at least two signal sequences which are fed to the circuit 16 via a pair of signal paths 20 and 30, that are connected to transmitter 3 and receiver 15, respectively. Circuit 16 outputs a confirmation signal sequence on a signal path 25 if the signals received from transmitter 3 and receiver 15 coincide with one another.

A stationary transceiver 21 is disposed remotely from hand unit 5, and communicates with the transmitter 3 and receiver 15 of hand unit 5, via a receiver 23, and a transmitter 24, respectively. Transceiver 21 is also provided with a self-resetting electronic memory circuit 22 for the temporary storage of the received signal sequences.

Receiver 23 is connected by means of a signal path 13, to the electronic control unit 14 for activating a control element of a rotary printing machine, such as a motor, valve, etc.

In the operation of the device, when one of the command push buttons 8 of hand unit 5 is depressed, transmitter 3 transmits a control signal sequence specifically allocated to the given command, through a wireless signal path 7 to receiver 23 of transceiver 21. At receiver 23, the signal sequence is converted to an electric signal sequence, and transferred via a signal path 17 to transmitter 24 of transceiver 21, where the signal is converted once again into a wireless signal sequence, and transmitted back, via a wireless signal path 17.1, to receiver 15 of hand unit 5. Simultaneously, an electric signal sequence of the same information content as that of the sequence transmitted to receiver 23, is transferred from transmitter 3 via signal path 20 to decoding and comparator circuit 16. The wireless signal sequence that is received by receiver 11, is converted into a corresponding electric signal sequence by the same, and fed by signal path 30 to the decoding and comparator circuitry 16. There, the two electric signal sequences are compared with each other. Only if a complete coincidence of both signal sequences exists is a confirmation signal sequence formed and fed via signal path 25 to transmitter 3, which converts this electric confirmation signal sequence into a wireless, transferable confirmation signal sequence, and transmits the same via a wireless signal path 18, to receiver 23 of transceiver 21. Receiver 23 converts the signal sequence into an electric signal corresponding to the desired command, and feeds it signal path 13 to electric control unit 14.

If desired, the decoding, comparator, and transfer circuit 16 can be implemented on a microcomputer, instead of by hard wired circuits. Also, in order to increase the system immunity even further, each of the electric or wireless transferable control signal sequences can be checked by any suitable error checking scheme, such as the check sum method.

The wireless connection between the stationary transceiver 21 and the transmitter 3 and receiver 15 of the hand unit can also be used to transfer fault/failure messages, safety functions, operating data onto the display 9, to set off acoustic warning signals, or for coupling control master computers and slave control computers. It is also possible to initiate each signal sequence via one of the command push buttons 8 at least twice, and to only to activate the confirmation signal sequence after complete accordance of the information. Since each signal sequence as an information group consists of signals and their intermediate signal pauses, these may also be used for the verification of the signal sequences.

The wireless transfer device can be designed also, by means of any known speech analysis system, to execute the remote control of a printing machine verbally via common command words such as "Forward inching", "Stop", "Run", etc. The tone color of the voice of the individual operator can be taken advantage of for this, for the admissibility of certain commands.

The verbal commands can be converted into infrared light pulses, and vice versa for the purpose of increasing the transfer assurance. The input and acknowledgment of verbal commands can be achieved with or without lines. The information content of the speech can be achieved through modulation, either electro-magnetically, or by means of induction loops. Narrow band IR filters on the transmitters and receivers can reduce interference, and thereby increase the fault immunity. Naturally, polarized IR light can be transmitted and received to also reduce intereference.

Figure 3:
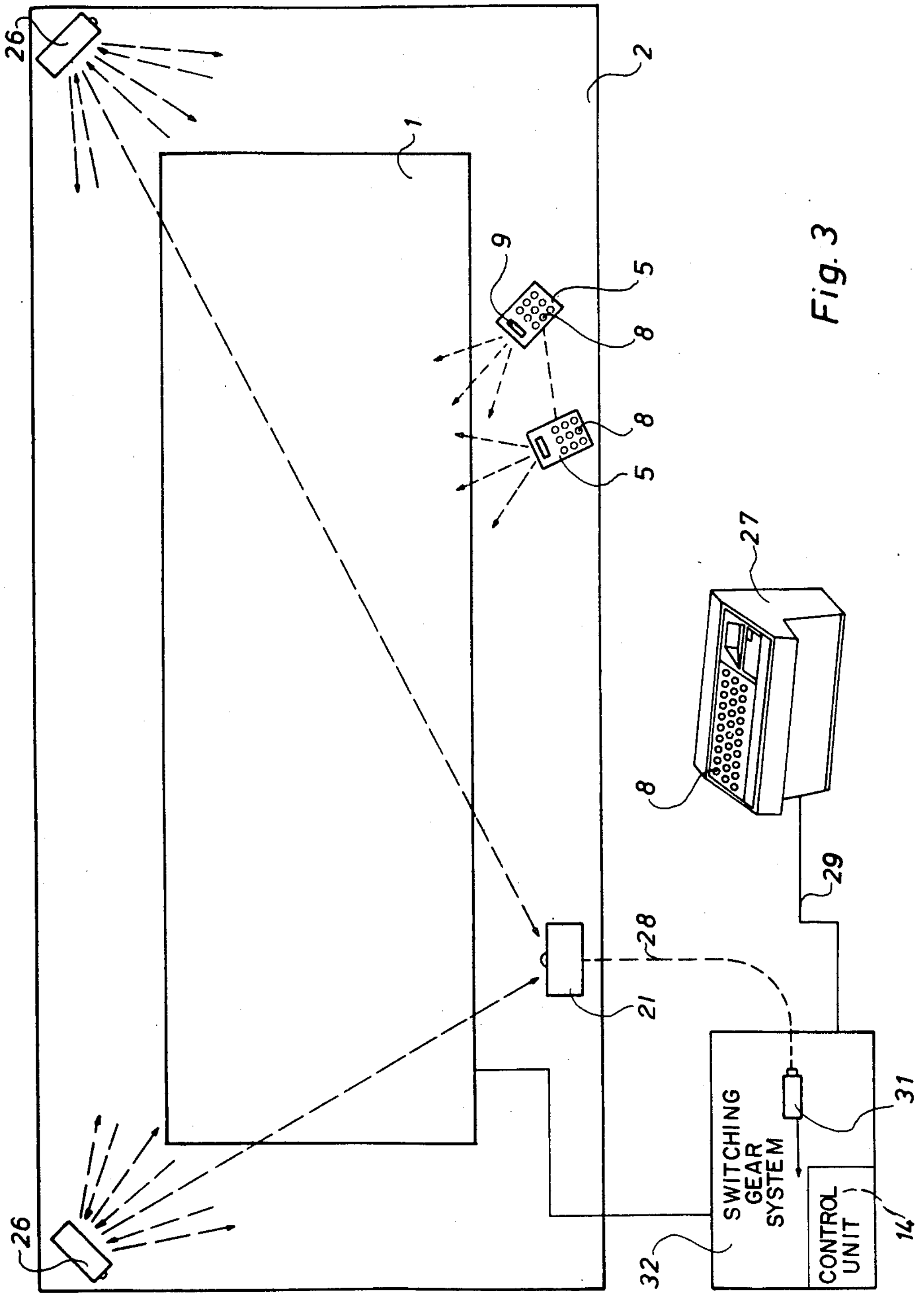

Turning now to FIG. 3, there is illustrated a large web-fed rotary printing machine 1 disposed in a printing shop 2. In larger web-fed rotary printing machines such as this, it is particularly necessary to be able to give commands with absolute reliability, even from remote parts of the machine. This is achieved through the use of one or more relay stations 26, which are suspended in the printing shop 2 over the web-fed rotary printing machine 1. Each relay station 26 consists of one receiver and one transmitter cooperating with it. The transmitter(s) of the relay station(s) is/are aligned with the transceiver 21 which is, for example, mounted on a switching gear system 32. The command is given in the same way as described above with reference to FIG. 2, via the hand unit 5. The same safety arrangement can be used for this. The pulse sequences sent out from the transmitter of the hand unit 5 are either relayed directly, or indirectly via one of the relay stations 26, to the transceiver 21, which processes the sequences as described previously with respect to FIG. 2. A pair of fiber optic cables 28 and 29 are provided which direct the IR control signal sequences from transceiver 21 or a push button board 38 of an operating desk 27, respectively, to a fiber optic receiver 31, which in turn is connected to switch gear system 32 that includes free programmable control unit 14.

Although the invention has been described in terms of preferred embodiments, it should be understood that numerous modifications and additions could be made without departing from the true spirit and scope of invention as defined by the following claims.

We claim:

1. A device for the remote control of a printing machine, comprising;

at least a first electronic machine control signal means for controlling a mechanism of a printing machine;

means to generate control signal sequences for said control means;

first transmitter means to wirelessly transmit control signal sequences from said control signal sequence generating means;

first receiver and decoding means connected to said electronic machine control signal means for receiving and encoding wirelessly transmitted control signal sequences from said transmitter means, and feeding the sequences to said control means; and, means to verify that the control signal sequence received by the receiver is the same as the control signal sequence transmitted by the transmitter, said means to verify comprising;

second transmitter means connected to said first receiving and decoding means for retransmitting a received control signal sequence;

second receiving and decoding means for receiving a retransmitted control signal sequence from said second transmitter means;

comparator means connected to said first transmitter means and said second receiving and decoding means for comparing a control signal sequence in said transmitter with a control signal sequence received by said second receiving and decoding means;

means to generate a confirmation signal sequence if the control signal sequences in the comparator coincide; and, means to transfer said confirmation signal sequence to said first transmitter means for transmission to said first receiver and decoding means, where said confirmation sequence is received, decoded, and fed to said control means.

2. The device of claim 1, wherein said first transmitter means transmits said control signal sequences either by electromagnetic waves, such as infrared or visible rays, or by acoustic waves.

3. The device of claim 2, wherein said control signal sequences are transmitted by polarized infrared light rays.

4. The device of claim 1, wherein said means to generate control signal sequences and said first transmitter means are disposed in a portable housing that can be held, and includes magnetic means disposed on an outer surface of the same, for attaching the housing to a metal machine part.

5. The device of claim 1, wherein said control signal sequences include a check sum for verification of the control signal sequence.

6. The device of claim 1, wherein the wireless connection can also be used for the transfer of fault/failure messages, collected fault/failure messages, safety functions, operating data, and for coupling between control master computers and slave control computers.

7. The device of claim 1, wherein each control signal sequence consists of signals and their intermediate signal pauses, and said signal pauses are also utilized for the verification of the control signal sequences.

8. The device of claim 1, wherein said first receiver and decoding means includes means to convert a received control signal sequence into a serial ASCII information chain, and light conductors for feeding converted sequences into said control means.

9. The device of claim 1, wherein narrow band infrared filters are included in said first transmitter means and said first receiver and decoding means, to decrease interference.

* * * * *